Patented Aug. 1, 1939

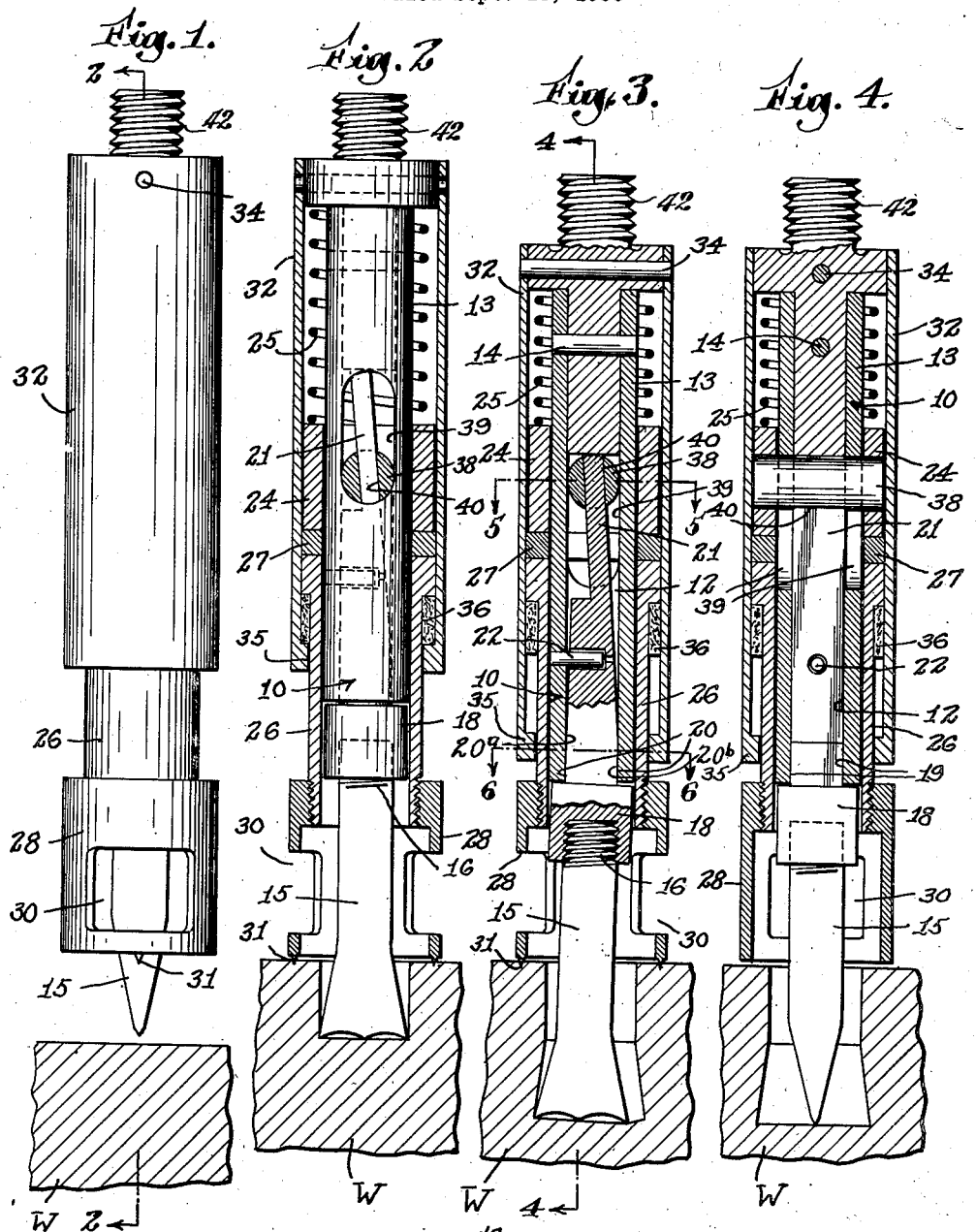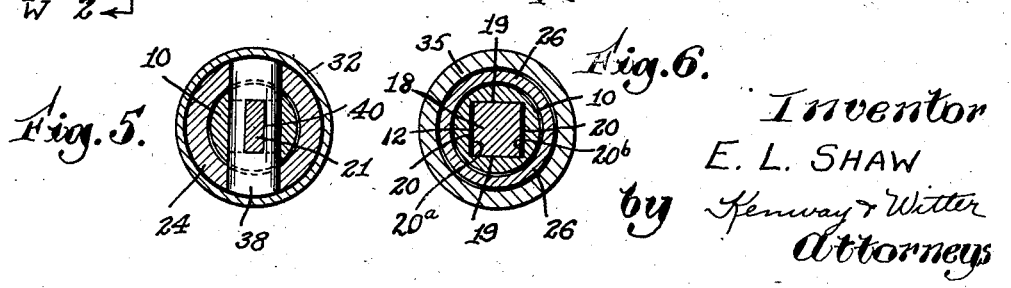

2,168,176

UNITED STATES PATENT OFFICE 2,168,176

BORING TOOL

Edward L. Shaw, Brookline, Mass., assignor to Shawlock, Inc., Boston, Mass., a corporation of Massachusetts Application September 15, 1936, Serial No. 100,849

2 Claims. (Cl. 145—124)

This invention relates to boring tools and more particularly to a tool for boring taper holes. Holes which are respectively of uniform diameter for a portion of the depth thereof and then taper outwardly at the bottom are particularly useful for doweling purposes as in the manufacture of furniture. Various tools which have been devised for boring these holes are usually quite complex, expensive to manufacture and of such delicate construction as to be unable to withstand hard usage. The primary object of my invention is to produce an improved taper hole boring tool wherein these objections are eliminated.

My improved tool embodies primarily a main supporting shank having the shank of the cutter extending into a bore therein and supported directly against the walls of such bore. Other means is provided within and exteriorly of the bore for causing the cutter to rock laterally during its forward movement whereby to cut a tapering hole. Such construction is relatively simple and provides an extremely rugged support for the cutter.

These and other features of the invention will be best understood and appreciated from the following description of a preferred embodiment thereof, selected for purposes of illustration and shown in the accompanying drawing, wherein—

Fig. 1 is an elevation of my improved boring tool.

Fig. 2 is a vertical partial section therethrough, taken on line 2—2 of Fig. 1, and showing a hole partially bored thereby.

Fig. 3 is a like view substantially in full section showing the hole completed.

Fig. 4 is a sectional view taken on line 4—4 of Fig. 3.

Figs. 5 and 6 are cross sections taken on lines 5—5 and 6—6 of Fig. 3.

The tool as illustrated in the drawing comprises a main shank or spindle 10 having a bore 12 therein open at the forward end of the shank, the shank being conveniently constructed of two parts including a tube 13 pinned at 14 to the main shank body. The cutter or bit 15, which forms the subject matter of my co-pending application, Serial No. 212,629, filed June 9, 1938, is threaded at 16 into a shank portion 18 extending into the bore 12. The mouth of the bore 12 is preferably square in cross section, as shown in Fig. 6, and the intermediate portion of the cutter shank 18 which cooperates therewith is substantially of corresponding size and shape, the arrangement being such that two diametrically opposed walls 19 are flat and parallel and in continuous flat engagement with the shank portion 18 adjacent to and rearwardly of the mouth of the bore (see Fig. 4) while the other two opposed walls 20 have a limited but constant engagement with the shank portion 18 adjacent to the mouth of the bore (see Fig. 3) permitting the cutter to rock laterally a slight amount to the position shown in Fig. 3. During such rocking movement the cutter shank rocks on a transversely extending fulcrum contact with the wall 20 at the right in Fig. 3. The stem of the shank 18 which is within the bore 12 has one wall 20ª flat and parallel with the longitudinal axis of the shank and the opposite wall 20ᵇ of the shank is inclined inwardly from a point adjacent to the open end of the bore 12, the extreme rearward end portion 21 of the shank being cut away to provide parallel sides as indicated in Fig. 3. A pin 22 extending transversely into the tube 13 and cutter shank 18 holds the latter within the former.

A sleeve 24 mounted to slide on the tube 13 is normally forced forwardly by a spring 25 on the tube rearwardly of the sleeve. A continuation 26 of the sleeve 24, with a thrust washer 27 therebetween is also mounted on the tube forwardly of the sleeve 24. A work engaging member 28 provided with open sides 30 and spurs 31 is threaded to the forward end of the sleeve 26. An outermost sleeve 32 pinned to the main shank at 34 houses the inner sleeves 24 and 26 and the spring 25, the forward end of this sleeve 32 being provided with an inner annular rib 35 cooperating with a resilient packing 36 on the sleeve 26 to limit forward movement of the inner sleeves and member 28 under the action of the spring 25, the packing serving to absorb shock and provide lubrication.

The extreme inner end 21 of the cutter shank may abut against the main shank body piece which carries the threaded stud 42, as illustrated in Fig. 3, or the shouldered portion thereof may abut against the outer end of the tube 13, whereby to take the end thrust of the cutter. A pin or block 38 carried by the sleeve 24 extends transversely through slots 39 in the tube 13 and is provided with a slot 40 therethrough and through which extends the inclined end 21 of the cutter shank.

The operation of the tool is substantially as follows:

The tool is supported in a socket threaded onto the stud 42. In the normal position of the tool (Fig. 1), the cutter projects outwardly beyond the work engaging member 28 and the flat and parallel surface 20ª of the shank 18 is in full surface contact with the corresponding surface 20 of the bore 12 whereby normally supporting the cutter shank on three flat surfaces 19, 19 and 20 at three sides thereof. In the boring operation this projecting portion of the cutter preliminarily bores a cylindrical hole (Fig. 2). When the member 28 comes in contact with the work W further forward movement of this member, of the sleeves 26 and 24 and of the block 37 is arrested. Continued forward movement of the tool against the action of the spring 25 causes the inclined portion 21 of the cutter shank to move downwardly through the block and such movement causes the cutter to rock laterally in a manner gradually moving the cutting body to one side and boring a tapering hole as the cutter rotates and moves forwardly. The inclined wall 20ᵇ of the shank permits such movement and the flat and parallel surfaces 20 and 20ᵃ thereupon separate as illustrated in Fig. 3. It will be apparent that during this movement and the resulting cutting action, the entire shank 18 within the bore is firmly supported in two directions in the main shank 10 by a continuous flat and parallel contact with the walls 19 and is also preferably supported on both surfaces 20 at the forward end of the main shank or spindle 10. The arrangement as illustrated, therefore, provides surface support for the tool at all four sides of the shank 18 during the cutting operation whereby firmly backing up the tool against side thrusts caused by the outward lateral movement of the cutter as it is moved forwardly. It will be readily apparent that such construction provides a firmer support for the cutter than have constructions heretofore known and which have depended on pivot pins for taking these side thrusts. This tool will continue to do accurate boring since the cutter shank has no pivotal points subject to wear with resulting chatter and displacement as is the case when using pivot pins, it being apparent that a very small amount of such looseness will seriously affect the tool and its efficiency. Furthermore, the several parts of the tool are relatively simple to manufacture and assemble and they are so related as to provide a more compact and rugged tool for the purpose described.

Having thus described my invention, what I claim as new and desire to secure by Letters Patent of the United States is:

1. A taper hole boring tool comprising a main shank having a bore therein open at the forward end of the shank, the bore having two opposing and parallel walls adjacent to its said end and extending rearwardly thereof and a cooperating intermediate wall adjacent to said end, a cutter shank including a stem extending into and supported within the bore by surface contact with said parallel walls and a transversely extending fulcrum contact with the intermediate wall, a sleeve slidable on said main shank, a spring normally urging the sleeve forwardly, and means carried by the sleeve and cooperating with said stem for causing the cutter shank to rock laterally on said fulcrum contact between and parallel with said opposing walls during forward movement thereof in the boring operation and while the cutter shank remains in supporting surface contact with said parallel walls and in fulcrum contact with the intermediate wall, the stem having clearance at a point spaced from said fulcrum contact within the bore permitting said rocking of the cutter shank.

2. A taper hole boring tool comprising a main shank having a bore therein open at the forward end of the shank, the bore being rectangular in cross section and providing four inwardly facing wall surfaces adjacent to said end, two of said surfaces being flat and parallel and extending rearwardly from said end of the bore, a cutter shank including a stem supported within the bore by cooperating flat and parallel surfaces thereon in surface contact with the first-named parallel surfaces, the portion of the stem adjacent to said forward end of the bore being of cross sectional shape substantially corresponding to that of said end of the bore and the stem having such limited contact with the other two walls of the bore at its said end as to permit lateral rocking movement of the cutter shank about said end of the bore in a direction keeping said flat and parallel surfaces in contact during such movement, and means for causing the cutter shank to thus rock during forward movement thereof in the boring operation, the stem having clearance within the bore at a point spaced from said fulcrum contact permitting said rocking movement.

EDWARD L. SHAW.